(12) United States Patent
Chen et al.

(10) Patent No.: US 11,675,740 B2
(45) Date of Patent: Jun. 13, 2023

(54) TIERED CACHE FILLING

(71) Applicant: NETFLIX, INC., Los Gatos, CA (US)

(72) Inventors: Andrew Chen, Sunnyvale, CA (US);
Christopher Brand, Livermore, CA (US); Daniel P. Ellis, West Pittston, PA (US); Alex Gutarin, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 198 days.

(21) Appl. No.: 17/322,714

(22) Filed: May 17, 2021

(65) Prior Publication Data

US 2021/0271639 A1 Sep. 2, 2021

Related U.S. Application Data

(63) Continuation of application No. 15/067,099, filed on Mar. 10, 2016, now Pat. No. 11,010,341.
(Continued)

(51) Int. Cl.
*G06F 16/18* (2019.01)
*G06F 16/172* (2019.01)
(Continued)

(52) U.S. Cl.
CPC .......... *G06F 16/172* (2019.01); *G06F 16/137* (2019.01); *G06F 16/183* (2019.01);
(Continued)

(58) Field of Classification Search
CPC ... G06F 16/1824; G06F 16/137; G06F 16/172
See application file for complete search history.

(56) References Cited

U.S. PATENT DOCUMENTS 9,372,870 B1 6/2016 Levy
10,255,188 B2 * 4/2019 Manoharan ......... G06F 12/0875
(Continued)

FOREIGN PATENT DOCUMENTS

CN 102855294 A 1/2013
CN 104065568 A 9/2014
(Continued)

OTHER PUBLICATIONS

Fujita et al., "Dynamic Mirroring of Selective Contents in CDN and Evaluation of the Performance Thereof", Information Processing Society of Japan Research Report, vol. 2001, No. 111, Nov. 21, 2001, pp. 61-68-2001-QAI-1.
(Continued)

*Primary Examiner* — Eliyah S. Harper
(74) *Attorney, Agent, or Firm* — Artegis Law Group, LLP

(57) ABSTRACT

One embodiment of the present invention sets forth a technique for replicating a file within a network of servers. The technique includes determining one or more regional master servers included in a regional cluster of servers and causing each regional master server to retrieve a file from a fill source. The technique further includes, for at least one local cluster of servers included in the regional cluster of servers, determining one or more local master servers included in the at least one local cluster of servers, and causing each local master server to retrieve the file from one of the one or more regional master servers.

27 Claims, 9 Drawing Sheets

Related U.S. Application Data

(60) Provisional application No. 62/155,430, filed on Apr. 30, 2015.

(51) Int. Cl.

| | | |
|---|---|---|
| *G06F 16/13* | (2019.01) | |
| *G06F 16/182* | (2019.01) | |
| *H04L 67/1023* | (2022.01) | |
| *H04L 67/06* | (2022.01) | |
| *H04L 67/1097* | (2022.01) | |

(52) U.S. Cl.
CPC ...... *G06F 16/1824* (2019.01); *H04L 67/1023* (2013.01); *H04L 67/06* (2013.01); *H04L 67/1097* (2013.01)

(56) References Cited

U.S. PATENT DOCUMENTS

| | | | |
|---|---|---|---|
| 10,645,425 B2* | 5/2020 | Park | H04N 21/23106 |
| 11,140,092 B2* | 10/2021 | Mihály | H04W 36/0033 |
| 11,513,904 B2* | 11/2022 | Malamut | G06F 11/1464 |
| 11,532,013 B2* | 12/2022 | Connolly, Jr. | H04L 67/02 |
| 2007/0276838 A1 | 11/2007 | Abushanab et al. | |
| 2008/0065704 A1 | 3/2008 | MacCormick et al. | |
| 2008/0301135 A1 | 12/2008 | Alves et al. | |
| 2009/0307332 A1 | 12/2009 | Litwin | |
| 2010/0100963 A1 | 4/2010 | Mahaffey | |
| 2011/0191447 A1 | 8/2011 | Dazzi et al. | |
| 2012/0072656 A1 | 3/2012 | Archak et al. | |
| 2014/0188825 A1 | 7/2014 | Muthukkaruppan et al. | |
| 2014/0304756 A1 | 10/2014 | Fletcher | |
| 2014/0351227 A1 | 11/2014 | Christodorescu et al. | |
| 2019/0123898 A1* | 4/2019 | Martín Rodríguez | H04L 9/0643 |
| 2019/0230156 A1* | 7/2019 | McLarty | G06F 9/45558 |
| 2019/0230462 A1* | 7/2019 | McLarty | H04L 67/12 |
| 2019/0359736 A1* | 11/2019 | Aihara | C08F 2/22 |
| 2020/0184278 A1* | 6/2020 | Zadeh | G06F 16/43 |
| 2021/0374121 A1* | 12/2021 | Paul | H04L 9/0894 |
| 2022/0043715 A1* | 2/2022 | Liao | G06F 11/1484 |
| 2022/0164310 A1* | 5/2022 | Mezaael | G06F 16/134 |
| 2022/0197944 A1* | 6/2022 | Kaplingat | G06F 16/906 |
| 2022/0283987 A1* | 9/2022 | Nakamura | G06F 16/137 |

FOREIGN PATENT DOCUMENTS

| | | |
|---|---|---|
| JP | 2005-031987 A | 2/2005 |
| JP | 2008-035337 A | 2/2008 |
| JP | 2008-198047 A | 8/2008 |
| JP | 2010-238162 A | 10/2010 |
| JP | 2011-010288 A | 1/2011 |
| JP | 2011-118593 A | 6/2011 |
| KR | 10-2014-0032064 A | 3/2014 |
| KR | 10-2015-0011087 A | 1/2015 |

OTHER PUBLICATIONS

Takagi et al., "Replication Arrangement Technique for Dispersing Loads in DHT", Papers from the Institute of Electronics, Information, and Communication Engineers 2007 General Conference, The institute of Electronics, Information, and Communication Engineers, Communication 2, Mar. 7, 2007, pp. 135, B-7-45.

Hong et al., "Fast Cascading Replication Strategy for Data Grid", 2008 International Conference on Computer Science and Software Engineering, IEEE, Dec. 12-14, 2008, pp. 186-189.

* cited by examiner

TIERED CACHE FILLING

CROSS-REFERENCE TO RELATED APPLICATIONS

This application is a continuation of the U.S. patent application titled, "TIERED CACHE FILLING," filed on Mar. 10, 2016 and having Ser. No. 15/067,099, which claims the priority benefit of the U.S. provisional patent application titled, "TIERED CACHE FILLING," filed on Apr. 30, 2015 and having Ser. No. 62/155,430. The subject matter of these related applications is hereby incorporated herein by reference.

BACKGROUND OF THE INVENTION

Field of the Invention

Embodiments of the present invention relate generally to data transmissions over computer networks and, more particularly, to tiered cache filling.

Description of the Related Art

Many web-based applications provide services, such as streaming audio and/or streaming video, in a distributed manner over the Internet. In general, such applications operate by distributing multiple copies of each content title, such as an audio file or video file, across multiple servers situated at one or more network locations. By mirroring content across multiple servers, the content can be accessed by a high-volume of users without those users incurring significant wait times. Additionally, maintaining multiple copies of a particular content title enables the web-based application to quickly and seamlessly recover when a hardware or software failure occurs with respect to a particular server.

In order to further reduce the latency times and overall network requirements associated with serving content titles to users, the servers on which content titles are stored are typically geographical distributed throughout one or more regions that are serviced by the web-application. The web-application is then configured to direct each user to a particular server that is located near the user in order to serve the content title to the user more efficiently.

Managing content titles stored on servers distributed within a large geographical area or across different geographical areas can present several challenges. In particular, copying a given content title to multiple servers located across a large geographical area can consume significant network resources, such as bandwidth. Consumption of network resources increases costs for the web-based application, especially if all or part of the network infrastructure is provided by third-parties. Additionally, conventional techniques for copying a given content title to multiple servers can oftentimes cause servers that initially receive the content title to experience significant fluctuations in bandwidth usage and processing load—for example, when other network servers "flood" the servers that initially receive the content title with requests for a copy of the content title. Such fluctuations can negatively impact the performance of those "initial" servers, which decreases the quality of service provided to users that are accessing the web-based application via the initial servers and/or causing the initial servers to experience software and/or hardware failures.

As the foregoing illustrates, improved techniques for distributing content across a network of servers would be useful.

SUMMARY OF THE INVENTION

One embodiment of the present invention sets forth a method for replicating a file within a network of servers. The method includes determining one or more regional master servers included in a regional cluster of servers and causing each regional master server to retrieve a file from a fill source. The method further includes, for at least one local cluster of servers included in the regional cluster of servers, determining one or more local master servers included in the at least one local cluster of servers, and causing each local master server to retrieve the file from one of the one or more regional master servers.

Further embodiments provide, among other things, a control server and a non-transitory computer-readable medium configured to implement the method set forth above.

At least one advantage of the disclosed techniques is that each file can be replicated across a network in a predictable, decentralized, and highly fault-tolerant manner via specific tiers of content servers, without requiring an entity to maintain a master index. Additionally, a predetermined delay may be assigned to each tier in order to prevent lower tiers from flooding content servers included in upper tiers, reducing the severity of server load fluctuations when replicating new or existing files across the network infrastructure. Moreover, because the content servers included in each tier are determined based on the identifier associated with the file, each file may propagate through the network infrastructure via a different sequence of content servers. As a result, network and processing loads are more evenly distributed among the content servers, increasing the overall quality of service provided to users that are accessing a web-based application via the content servers.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
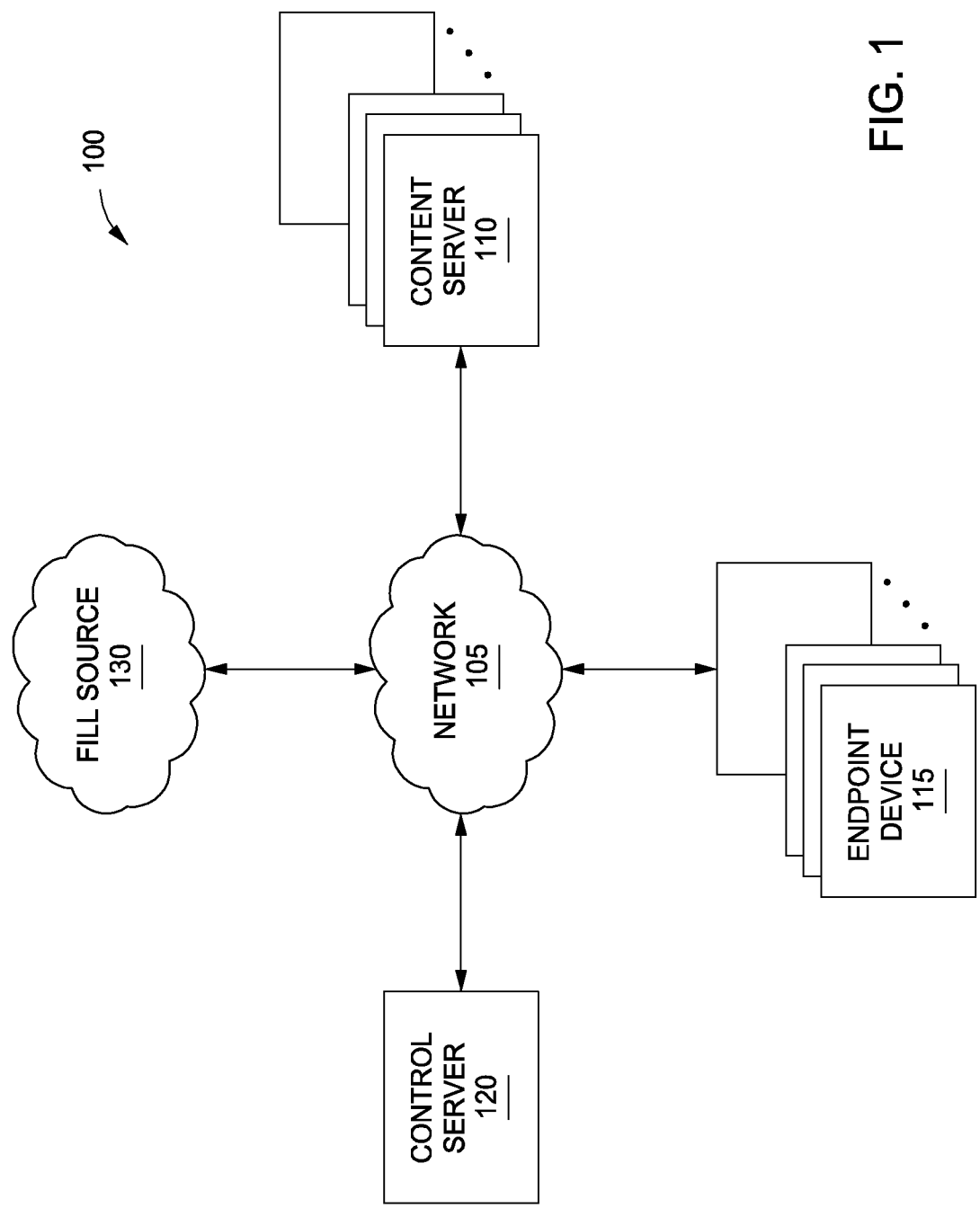
FIG. 1 illustrates a network infrastructure used to distribute content to content servers and endpoint devices, according to various embodiments of the invention.

FIG. 1 illustrates a network infrastructure 100 used to distribute content to content servers 110 and endpoint devices 115, according to various embodiments of the invention. As shown, the network infrastructure 100 includes content servers 110, control server 120, and endpoint devices 115, each of which are connected via a communications network 105.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various files that are tracked and managed by the control server 120. Each content server 110 may further communicate with a fill source 130 and one or more other content servers 110 in order "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the fill source 130 may include an online storage service (e.g., Amazon® Simple Storage Service, Google® Cloud Storage, etc.) in which a catalog of files, including thousands or millions of files, is stored and accessed in order to fill the content servers 110. Although only a single fill source 130 is shown in FIG. 1, in various embodiments multiple fill sources 130 may be implemented to service requests for files.

Figure 2:
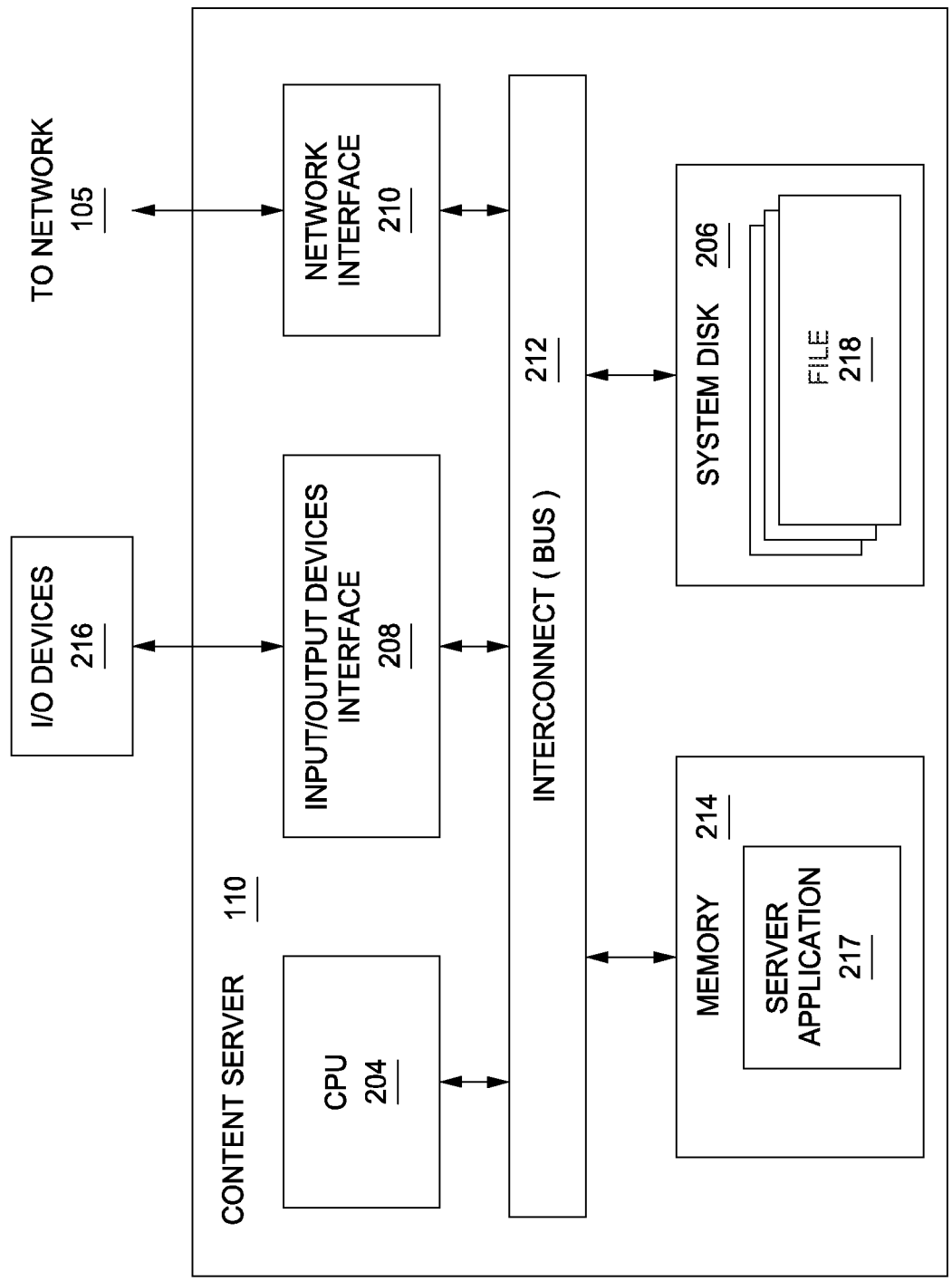
FIG. 2 is a block diagram of a content server that may be implemented in conjunction with the network infrastructure of FIG. 1, according to various embodiments of the present invention.

FIG. 2 is a block diagram of a content server 110 that may be implemented in conjunction with the network infrastructure 100 of FIG. 1, according to various embodiments of the present invention. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, and/or subtitles) associated with a content catalog. The files 218 can then be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105. The server application 217 is further configured to request instructions from the control server 120, such as the location(s) from which and/or time(s) at which a particular file can be requested from the fill source 130, a specific content server 110, etc.

Figure 3:
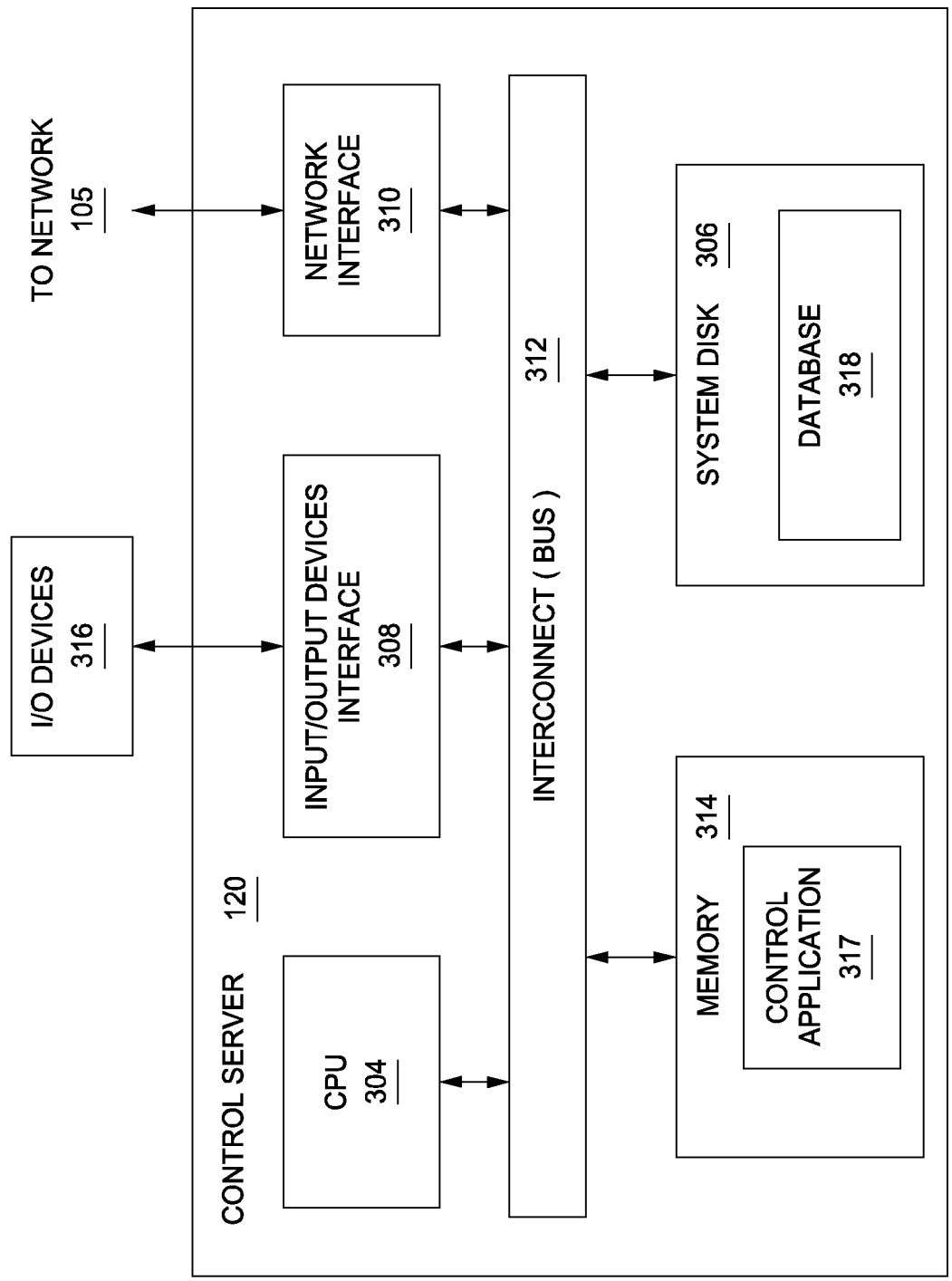
FIG. 3 is a block diagram of a control server that may be implemented in conjunction with the network infrastructure of FIG. 1, according to various embodiments of the present invention.

FIG. 3 is a block diagram of a control server 120 that may be implemented in conjunction with the network infrastructure 100 of FIG. 1, according to various embodiments of the present invention. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the fill source(s) 130, and the files 218.

The system memory 314 includes a control application 317 configured to access information stored in the database 318 and process the information to determine the manner in which specific files 218 will be replicated across content servers 110 included in the network infrastructure 100. For example, when content servers 110 are to be filled with copies of a new file 218, a listing of identifiers (ID) associated with the content servers 110, referred to as server IDs, are accessed from the database 318. The control application 317 then processes the server IDs in conjunction with a file ID associated with the new file 218 to determine how and when the new file 218 will be replicated across content servers 210 included in the network infrastructure 100, as described below in further detail in conjunction with FIGS. 4-6.

As previously described herein, managing content, such as audio and video files, stored on content servers 110 distributed across a large geographical area presents various challenges. In particular, in order to service a wide variety of endpoint devices 115 having different network and processing capabilities, each content title may be encoded at multiple (e.g., 10 or more) different bitrates. Consequently, a single content title, such as a movie or television show, may be associated with multiple files 218—each encoding the content title at a different bitrate—each of which may be stored by a content server 110 that is configured to serve the content title to endpoint devices 115.

Accordingly, attempting to fill the content servers 110 with a large catalog of content titles, each of which is associated with multiple files 218, can consume significant network resources. Thus, if each of the content servers 110 were to fetch files 218 directly from a third-party source, such as the fill source 130, and/or via a third-party network, significant access and bandwidth fees may be incurred.

On the other hand, minimizing the use of third-party sources/networks by attempting to fill content servers 110 using only a small number of local content servers 110 that initially receive the a file 218 may place undue burden on the initial content server(s) 110. Such a burden may lead to network and processing load fluctuations on the initial content servers 110 when other content servers 110 flood the content server(s) 110 with requests for the file 218.

Accordingly, in various embodiments, each file 218 may be replicated within the network infrastructure 100 via specific tiers of content servers 110 that can be precisely calculated based on the server IDs included in the network infrastructure 100 and the file ID associated with the file 218. Because the content servers 110 in which files 218 will be located can be precisely calculated based on server IDs and file IDs, file 218 access is deterministic, reducing or eliminating the incidence of cache misses. The number of content servers 110 included in each tier may be controlled, for example, based on the popularity of and demand for a particular file 218, by specifying a replication factor for each tier or for each file 218. As a result, the degree to which content servers 110 are locally filled can be adjusted, reducing third-party network and storage fees. Further, because the content servers 110 included in each tier are determined based on the file ID, each file 218 may be replicated across the network infrastructure 100 via a different sequence of content servers 110. Consequently, network and processing loads are more evenly distributed among the content servers 110, increasing the overall quality of service provided to users that are accessing a web-based application via the content servers 110.

In some embodiments, multiple files 218 are grouped by category, and a unique file ID is assigned to the files 218 associated with each category. For example, files 218 associated with content title A (e.g., a movie or television show) could be assigned a first file ID, while the files 218 associated with content title B are assigned a second file ID. Additionally, in some embodiments, a different file ID is assigned to each encoding of a content title at a different bitrate. That is, in such embodiments, the files 218 associated with content title A and a first bitrate could be assigned a first file ID, while the files 218 associated with content title A and a second bitrate could be assigned a second file ID. Such embodiments enable a complete set of files 218 associated with a particular category to be stored together on each of one or more content servers 110.

Additionally, in some embodiments, a unique file ID is assigned to each file 218. For example, each of the files 218 associated with content title A and a first bitrate could be assigned a different file ID. Such embodiments enable the files 218 associated with a particular category to be distributed across multiple content servers 110, for example, to enable the files 218 to be transmitted in parallel to a particular endpoint device 115. Further, in some embodiments, the granularity with which unique file IDs are assigned to the files 218 may vary per category.

In various embodiments, the file ID associated with a particular file 218 is encoded in a JavaScript Object Notation (JSON) object. JavaScript Object Notation (JSON) is a convention for representing data structures referred to as "objects" in a manner that is generally compatible with the JavaScript scripting language. Objects may include one or more elements, each of which is designated with a key. Each of the elements may be a string, a number, another object, an array, a Boolean value, or null. Arrays are ordered lists of elements delineated by square brackets "[" and "]." Elements in arrays are separated by commas. An example JSON object associated with a file 218 is presented below in Table 1.

TABLE 1

Example JSON Object

```
{
  "videos": [
    {
      id: 23432,
      title: "Eternal Sunshine of the Spotless Mind",
      boxart: "http://www.netflix.com/23432.png",
      synopsis: "A couple undergo a procedure to erase..."
    },
    {
      id: 23521,
      title: "The Mask",
      boxart: "http://www.netflix.com/5433.png",
      synopsis: "The Mask is a superhero who..."
    }
  ]
}
```

In the example JSON object presented above, the first and last curly brackets indicate the beginning and end of an object. "videos" is a key for the array of videos delineated by square braces "[" and "]." The array includes two elements, each delineated by curly braces. The first such element is an object that includes an "id" field, a "title" field, a "boxart" field, and a "synopsis" field with values as shown. Similarly, the second element in the array has the values as shown. Accordingly, in this example, file ID 23432 associated with a first file 218 ("Eternal Sunshine of the Spotless Mind") and file ID 23521 associated with a second file 218 ("The Mask") are specified.

Further, in some embodiments, a content server 110 may request download instructions (e.g., download locations, time delays, etc.) by transmitting a JSON object that includes multiple file IDs stored in an array to the control application 317. An example JSON object including such an array of file IDs is presented below in Table 2.

TABLE 2

Example JSON Array

{
  "fileIds": [
    {1 : 23432},
    {2 : 23521},
    {3 : 23638}
  ]
}

Figure 4:
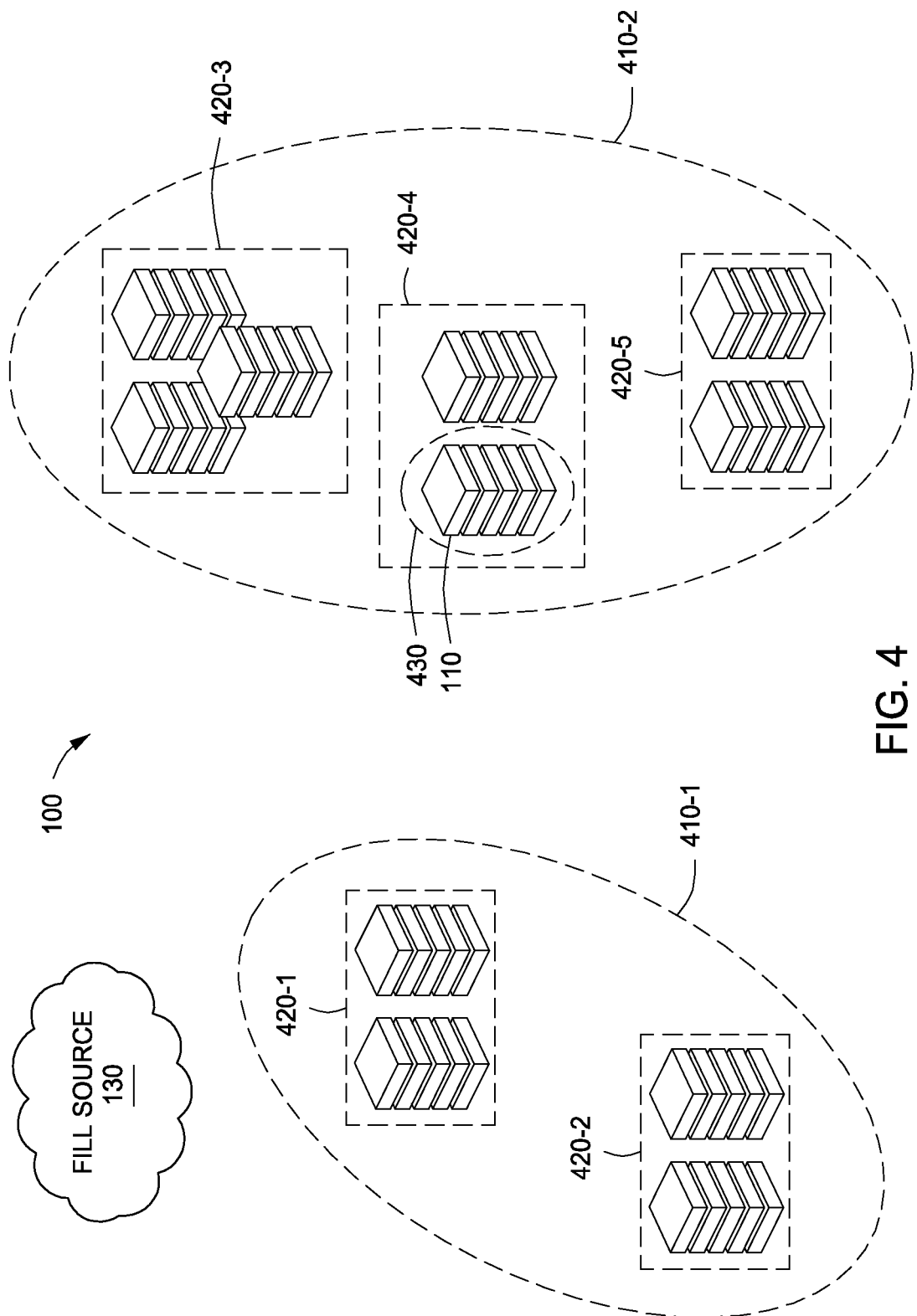
FIG. 4 illustrates how the content servers of FIG. 1 are geographically distributed, according to various embodiments of the present invention.

FIG. 4 illustrates how the content servers 110 of FIG. 1 are geographically distributed, according to various embodiments of the present invention. As shown, the content servers 110 may be organized into various clusters, including regional clusters 410, local clusters 420, and manifest clusters 430.

For example, in the exemplary geographical distribution shown in FIG. 4, the content servers 110 are organized into regional cluster 410-1 and regional cluster 410-2. In some embodiments, each regional cluster 410 may be associated with a different city, state, country, time zone, continent, and the like. Each regional cluster 410 includes one or more local clusters 420. For example, regional cluster 410-1 includes local cluster 420-1 and local cluster 420-2, and regional cluster 410-2 includes local cluster 420-3, local cluster 420-4, and local cluster 420-5. Each local cluster 420 includes one or more manifest clusters 430, each of which includes one or more content servers 110. For example, each of the manifest clusters 430 shown in FIG. 4 includes five content servers 110. However, any number of content servers 110 may be included in each manifest cluster 430. Further, any number of regional clusters 410, local clusters 420, manifest clusters 430, and content servers 110 may be included in the network infrastructure 100.

Figure 5A:
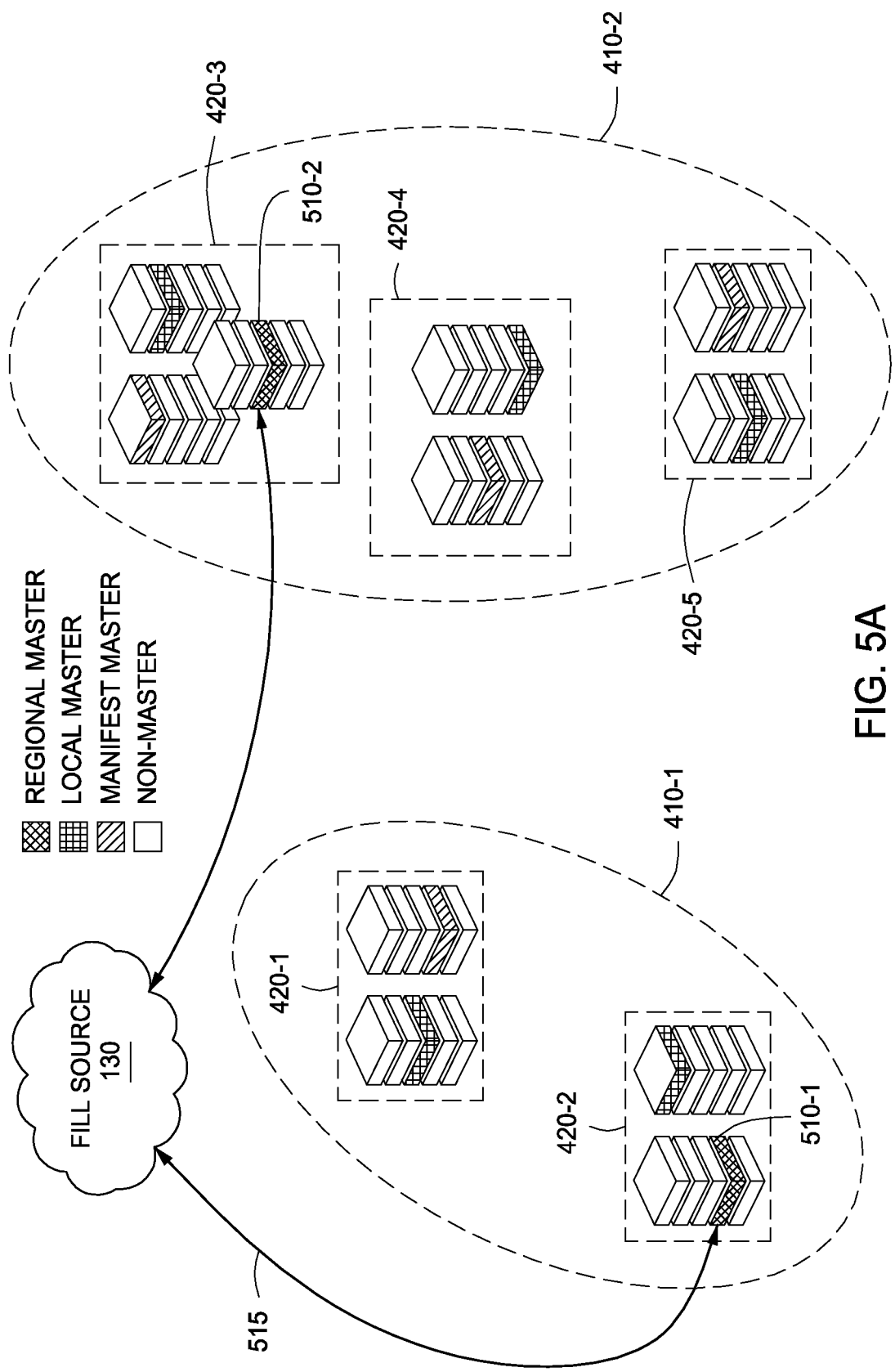
FIGS. 5A-5C illustrate a technique for replicating a file across different tiers of the geographically distributed content servers of FIG. 1, according to various embodiments of the present invention.
Figure 5B:
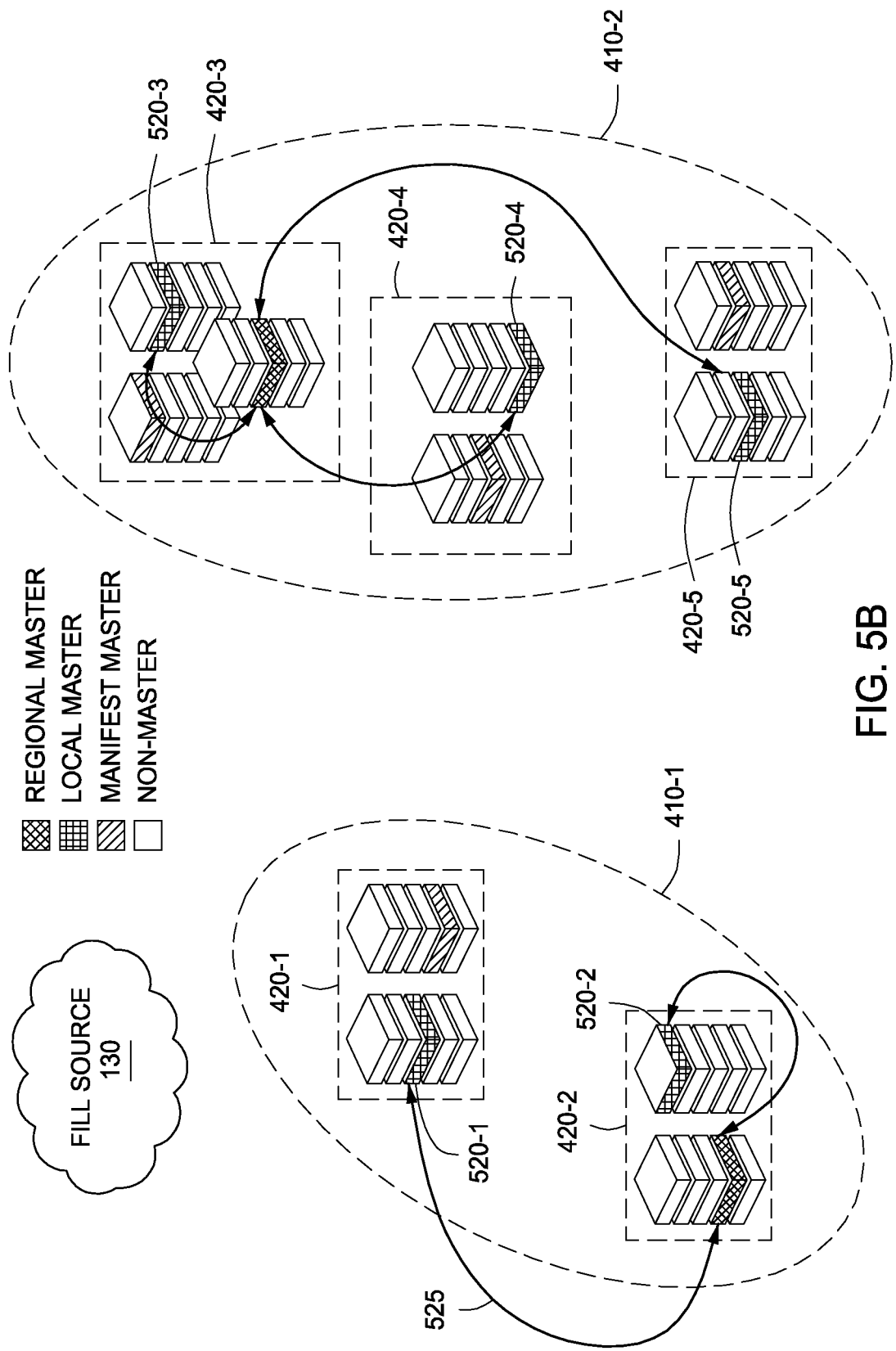
Figure 5C:
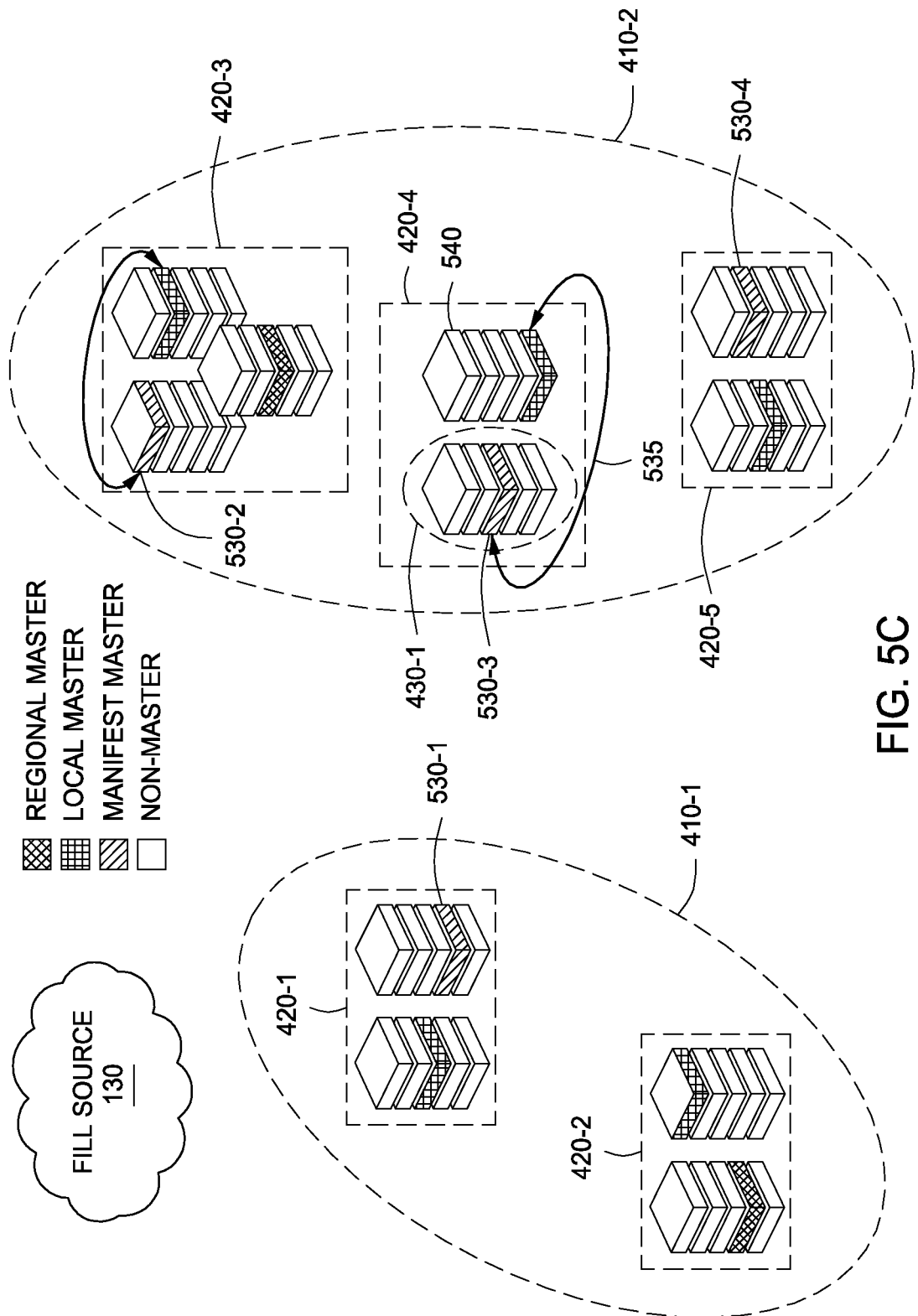

FIGS. 5A-5C illustrate a technique for replicating a file 218 across different tiers of the geographically distributed content servers 110 of FIG. 1, according to various embodiments of the present invention. In order to meet peak traffic demands and redundancy requirements, multiple copies of each file 218 may be replicated across the content servers 110 included in each regional cluster 410. Accordingly, in various embodiments, one or more hashing operations, such as the consistent hashing operation described below, may be performed by the control application 317 to evenly replicate files 218 across multiple content servers 110, without needing to pre-compute where the file 218 should be stored and without needing to store an index of content servers 110 in a centralized server. Although the techniques described herein are implemented in conjunction with a specific hashing operation, any technically feasible operation or technique may be used to select the content servers 110 included in the tiers through which a particular file 218 is replicated.

In various embodiments, the control application 317 may generate a hash value for each content server 110 included in a particular regional cluster 410 by performing a hashing operation (e.g., applying an MD5 message-digest algorithm) on each server ID associated with the content servers 110. The control application 317 then sorts the resulting hash values to form a hash data structure, such as a hash ring, a hash table, etc. In order to determine which content servers 110 will be used to replicate a particular file 218 across the regional cluster 410, the control application 317 then generates a hash value for the file 218 by applying the same (or a different) hashing operation to the file ID associated with the file 218.

Then, the control application 317 compares the hash value associated with the file 218 to the hash data structure and selects the content server 110 having a hash value closest to the hash value of the file 218 to be a regional master 510 for that particular file 218. Further, if a replication factor (RF)>1 is specified for the file 218 and/or for the regional master 510 tier, then the control application 317 selects as regional masters 510 one or more additional content servers 110 that are next (e.g., based on hash value) in the hash data structure. In some embodiments, the control application 317 selects the next content servers 110 in the hash data structure by "walking" around a hash ring or down a hash table, starting at the hash value associated with the first regional master 510 selected for the regional cluster 410, until a desired number of regional masters 510 is selected.

Once the regional masters 510 associated with the regional cluster 410 are selected, the regional masters 510, based on instructions received from the control application 317, immediately fetch 515 the file 218 from the fill source 130, as shown in FIG. 5A. For clarity of explanation, only one regional master 510 is shown in each regional cluster 410 illustrated in FIG. 5A. However, in embodiments having a RF>1, multiple regional masters 510 are selected for a particular file 218 and can immediately fetch the file 218 from the fill source 130.

Next, the control application 317 filters the hash data structure to include only the content servers 110 located in a particular local cluster 420. The control application 317 then selects one or more next content servers 110 included in the filtered hash data structure to be local masters 520 for the local cluster 420. For example, with reference to FIG. 5B, when determining one or more local masters 520 for local cluster 420-1, the control application 317 would filter the hash data structure to exclude all content servers 110 not included in local cluster 420-1. Then, the control application 317 selects the next content server 110, by hash value, remaining in the filtered hash data structure to be a local master 520 for the local cluster 420-1. Further, if a RF>1 is specified for the file 218 and/or for the local master 520 tier, then the control application 317 selects one or more next content servers 110 included in the filtered hash data structure to be local masters 520 for the local cluster 420-1. The control application 317 then repeats this process for each local cluster 420 included in the regional cluster 410.

The local masters 520 fetch 525 the file 218 from the regional masters 510, as shown in FIG. 5B. The control application 317 further provides instructions to the local masters 520 regarding how and when the file 218 can be fetched. In some embodiments, in order to prevent the regional master(s) 510 from being overwhelmed with requests for the file 218, the control application 317 instructs the local masters 520 associated with each local cluster 420 to wait a first predetermined period of time (e.g., 1 to 3 hours after the regional master(s) 510 fetch 515 the file 218 from the fill source 130) before fetching 525 the file 218 from the regional master(s) 510. Additionally, the control application 317 may instruct a local master 520 to fetch the file 218 from a more expensive source, such as the fill source 130, only after a second predetermined period of time (e.g., 2 to 4 hours after the regional master(s) 510 fetch 515 the file 218 from the fill source 130) that is longer than the first predetermined period of time. Implementing a second predetermined period of time after which a local master 520 can fetch a file from a more expensive source strikes a balance between decreasing network costs and reducing the occurrence of long delays due to network issues, software/hardware failures, etc. associated with a corresponding regional master 510. Further, in some embodiments, a local master 520 may fetch the file 218 from the regional master 510 associated with a different regional cluster 410.

Optionally, the control application 317 can filter the hash data structure again to include only the content servers 110 located in a particular manifest cluster 430. The control application 317 then selects one or more next content servers 110 included in the filtered hash data structure to be manifest masters 530 for the manifest cluster 430. For example, with reference to FIG. 5C, when determining one or more manifest masters 530 for manifest cluster 430-1, the control application 317 could filter the hash data structure to exclude all content servers 110 not included in manifest cluster 430-1. Then, the control application 317 selects the next content server 110, by hash value, remaining in the filtered hash data structure to be a manifest master 530-3 for manifest cluster 430-1. Further, if a RF>1 is specified for the file 218 and/or for the manifest master 530 tier, then the control application 317 could select one or more next content servers 110 included in the filtered hash data structure to be manifest masters 530 for the manifest cluster 430-1. The control application 317 then repeats this process for each manifest cluster 430 included in the regional cluster 410. Additionally, the control application 317 repeats the entire process of determining the regional masters 510, local masters 520, and manifest masters 530 for each regional cluster 410 included in the infrastructure network 100.

The manifest masters 530 fetch 535 the file 218 from the local masters 520, as shown in FIG. 5C. In some embodiments, in order to prevent the local master(s) 520 from being overwhelmed with requests for the file 218, the control application 317 instructs the manifest masters 530 associated with each manifest cluster 430 to wait a first predetermined period of time (e.g., 1 to 3 hours after the local master(s) 520 fetch 525 the file 218 from the regional master(s) 510) before fetching 535 the file 218 from the local master(s) 520. Additionally, the control application 317 may instruct a manifest master 530 to fetch the file 218 from a more expensive source, such as the regional master(s) 510, after a second predetermined period of time (e.g., 2 to 4 hours after the local master(s) 520 fetch 525 the file 218 from the regional master(s) 510). Further, the control application 317 may instruct a manifest master 530 to fetch the file 218 from the fill source 130 after a third predetermined period of time (e.g., 4 to 6 hours after the local master(s) 520 fetch 525 the file 218 from the regional master(s) 510).

Once a manifest master 530 within a particular manifest cluster 430 receives a copy of the file 218, each of the non-masters 540 included in the manifest cluster 430 can fetch the file 218 from the manifest master 530. Advantageously, fetches between non-masters 540 and manifest masters 530 within a manifest cluster 430 are typically do not incur any third-party network or storage fees. In some embodiments, the control application 317 instructs the non-masters 540 to wait an optional first predetermined period of time (e.g., 1 to 3 hours after the manifest master(s) 530 fetch 535 the file 218 from the local master(s) 520) before fetching the file 218 from the manifest master 530. Additionally, the control application 317 may instruct the non-masters 540 to wait before fetching the file 218 from more expensive sources, such as the local master(s) 520, regional master(s) 510, and fill source 130.

In order to avoid the "hot neighbor" problem—where content servers 110 located sequentially in the hash data structure receive multiple popular files 218 and, as a result, experience degraded performance—the control application 317 optionally combines each server ID with a plurality of values prior to generating the hash data structure. For example, the control application 317 may combine each server ID with a fixed range of 1,000 constants. The control application 317 then performs the hashing operation on each combination to generate 1,000 hash values for each content server 110. Consequently, each content server 110 will appear multiple times in the hash data structure, greatly reducing the likelihood that the same subset of content servers 110 will receive multiple popular files 218. An example is provided below.

In a specific example, assume that a particular regional cluster 410 includes 20 content servers. To create the hash data structure (e.g., a hash ring), the control application 317 combines each of the 20 server IDs with a fixed range of constants (e.g., 1 to 1000), applies the hashing operation to each of the combinations, and sorts the 20,000 resulting hash values to generate a hash ring. Further assuming that the content servers 110 are named A through T, the resulting hash ring could include the following hash values:

00000000: D
00003064: A
00005662: S
00007174: N
00009947: A
00012516: T
00015577: Q
00016652: R
00021625: L
00025057: Q
00028665: K
23451234: F
23453753: R
23456802: Q
23459919: I
23462687: A
23463273: I
23466229: T
23471069: M
23475876: G
23476011: T
(hash ring loops back to beginning)

Given a RF=3, the control application 317 then performs the hashing operation on the file ID associated with the file 218 and selects the first 3 content servers 110 encountered on the hash ring. For example, assuming that performing the hashing operation on the file ID results in a hash value of 00015500, the control application 317 will select Q as the primary content server 110, since 00015577 is the first content server 110 encountered after 00015500, and will select R and L as the replica content servers 110.

Figure 6A:
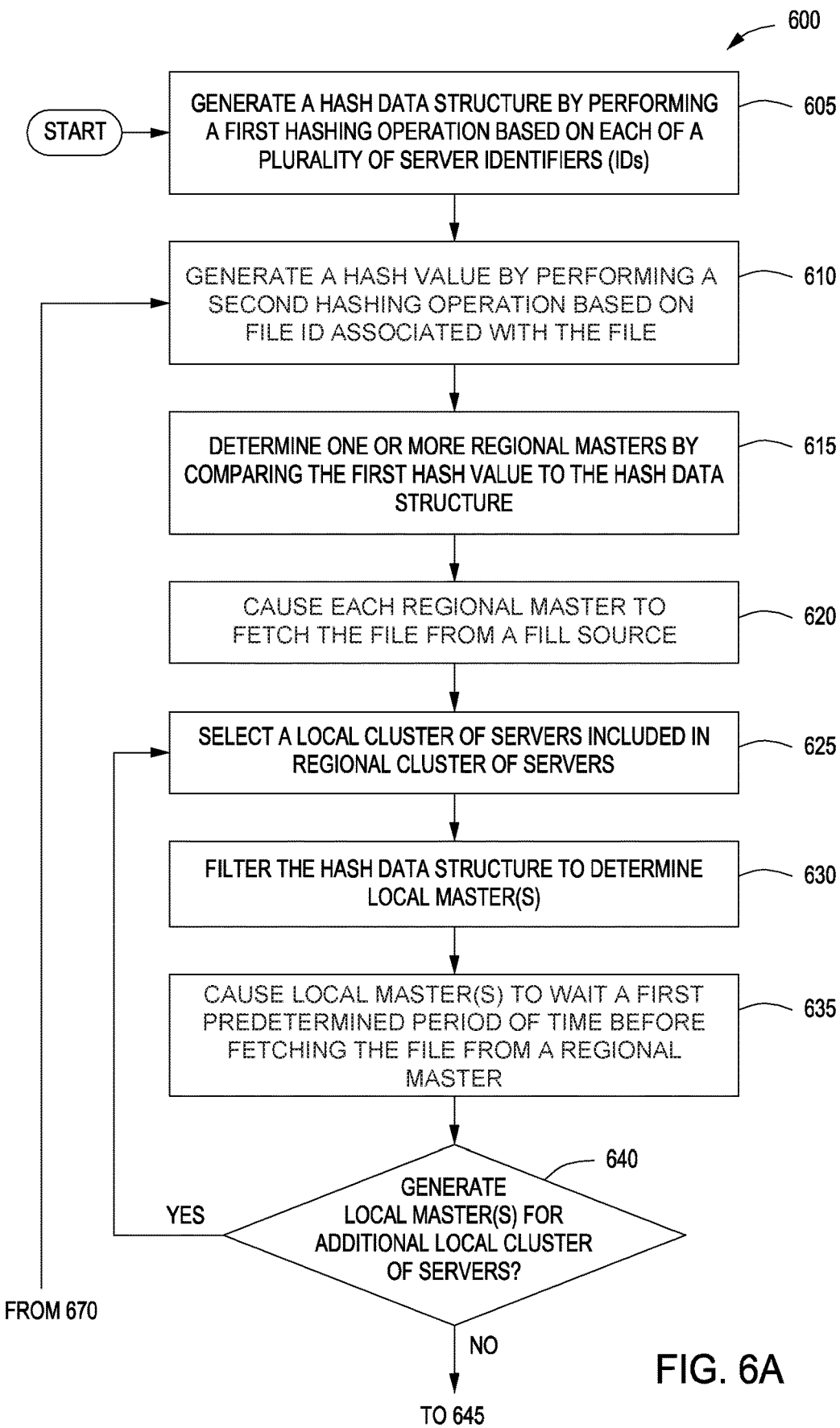
FIGS. 6A and 6B illustrate a flow diagram of method steps for replicating a file across geographically distributed content servers, according to various embodiments of the present invention.
Figure 6B:
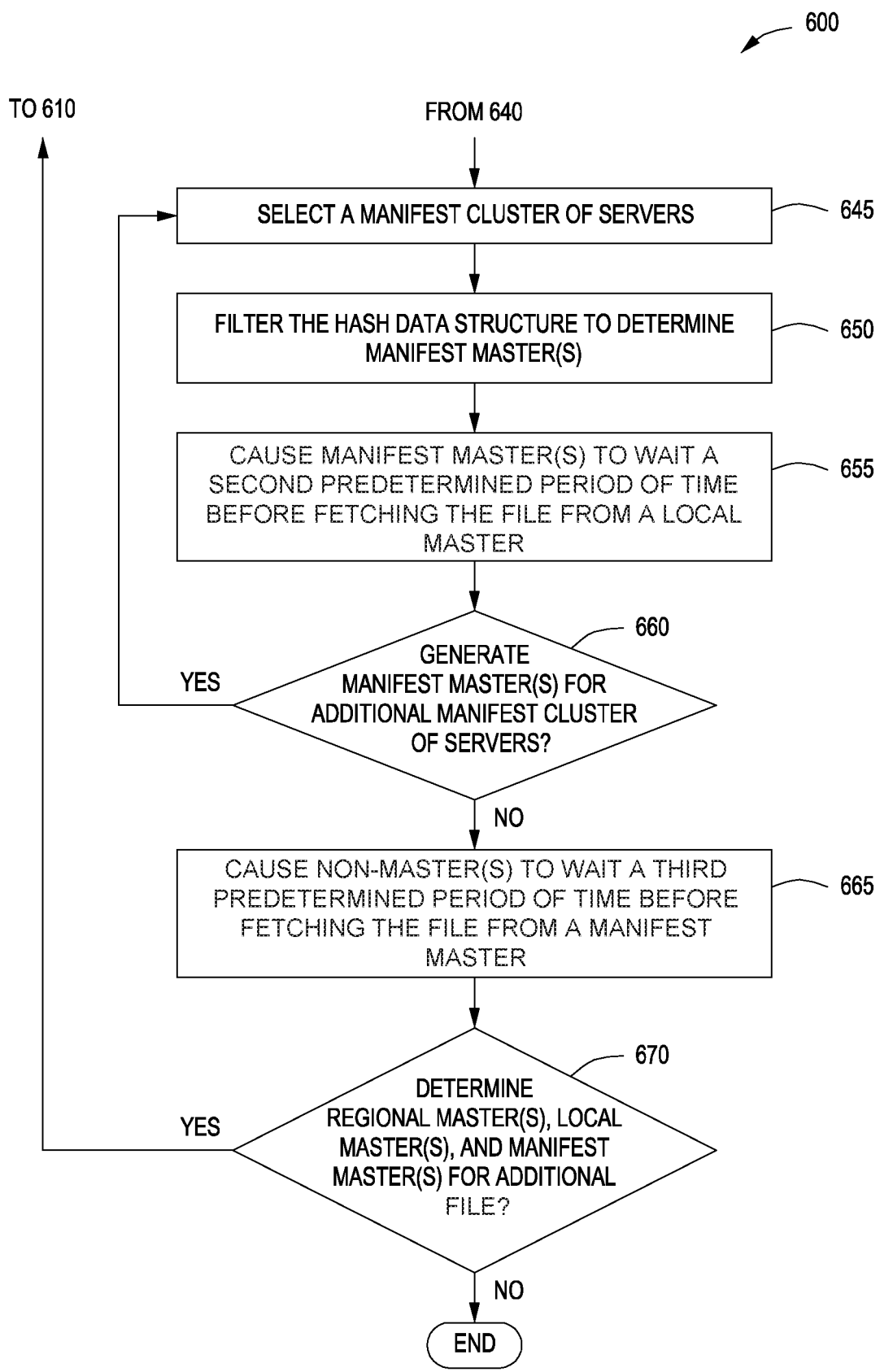

FIGS. 6A and 6B illustrate a flow diagram of method steps for replicating a file 218 across geographically distributed content servers 110, according to various embodiments of the present invention. Although the method steps are described in conjunction with the systems of FIGS. 1-5C, persons skilled in the art will understand that any system configured to perform the method steps, in any order, falls within the scope of the present invention.

As shown in FIG. 6A, a method 600 begins at step 605, where the control application 317 generates a hash data structure, such as a hash ring or a hash table, by performing a first hashing operation on the server identifiers (IDs)

associated with each of the content servers 110 included in a particular regional cluster 410 of content servers 110. At step 610, the control application 317 generates a hash value by performing a second hashing operation based on a file ID associated with the file 218. In some embodiments, the first hashing operation and the second hashing operation are the same (e.g., an MD5 hashing operation). However, in various embodiments, the first hashing operation and the second hashing operation may include different operations. Further, in some embodiments, the first hashing operation and/or the second hashing operation may include one or more transforms that modify the server IDs and/or file IDs.

At step 615, the control application 317 determines one or more regional masters 510 included in the regional cluster 410 by comparing the first hash value to the hash data structure. In various embodiments, the one or more regional masters 510 consist of a subset of content servers 110 included in the regional cluster 410. Then, at step 620, the control application 317 causes each regional master 510 to fetch the file 218 from the fill source 130. For example, the control application 317 may cause a regional master 510 to fetch a file 218 by issuing instructions to each regional master 510 in response to a JSON array received from the regional master 510 and specifying the file ID.

Next, at step 625, the control application 317 selects a local cluster 420 of content servers 110 included in the regional cluster 410. At step 630, the control application 317 filters the hash data structure to determine, based on the hash value generated for the file ID, one or more local masters 520 included in the local cluster 420. In various embodiments, the one or more local masters 520 consist of a subset of content servers 110 included in the local cluster 420. At step 635, the control application 317 then causes each local master 520 to wait a predetermined period of time before fetching the file 218 from a regional master 510. In some embodiments, the predetermined time that a local master 520 is required to wait before fetching the file 218 from a regional master 510 is the same for each local master 520, while, in other embodiments, the predetermined time may vary across the local masters 520.

At step 640, the control application 317 determines whether one or more local masters 520 need to be determined for an additional local cluster 420. If the control application 317 determines that one or more local masters 520 need to be determined for an additional local cluster 420, then the method 600 returns to step 625, described above. If the control application 317 determines that local master(s) 520 do not need to be determined for an additional local cluster 420, then the method 600 proceeds to step 645, shown in FIG. 6B, where the control application 317 selects a manifest cluster 430 of content servers 110.

At step 650, the control application 317 filters the hash data structure to determine, based on the hash value, one or more manifest masters 530 included in the manifest cluster 430. In various embodiments, the one or more manifest masters 530 consist of a subset of content servers 110 included in the manifest cluster 430.

Because the regional master(s) 510, local master(s) 520, and manifest master(s) 530 are determined based on the server IDs and the file ID, the locations at which the file 218 has been replicated in the infrastructure network 100, as well as the times at which the file 218 can be fetched from each location, can be determined by any content server 110 that has a record of the server IDs and file ID. Accordingly, files 218 may be replicated through the infrastructure network 100 in a decentralized, highly fault-tolerant manner, without requiring an entity, such as the control server 217, to maintain a master index.

At step 655, the control application 317 causes each manifest master 530 to wait a predetermined period of time before fetching the file 218 from a local master 520. In some embodiments, the predetermined time that a manifest master 530 is required to wait before fetching the file 218 from a local master 520 is the same for each manifest master 530, while, in other embodiments, the predetermined time may vary across the manifest masters 530.

At step 660, the control application 317 determines whether one or more manifest masters 530 need to be determined for an additional manifest cluster 430. If the control application 317 determines that one or more manifest masters 530 need to be determined for an additional manifest cluster 430, then the method 600 returns to step 645, described above. If the control application 317 determines that manifest master(s) 530 do not need to be determined for an additional manifest cluster 430, then the method 600 proceeds to step 665, where the control application 317 causes each non-master server 540 to wait a predetermined period of time before fetching the file 218 from a manifest master 530. In some embodiments, the predetermined time that a non-master server 540 is required to wait before fetching the file 218 from a manifest master 530 is the same for each non-master server 540, while, in other embodiments, the predetermined time may vary across the non-master servers 540.

At step 670, the control application 317 determines whether regional master(s) 510, local master(s) 520, and/or manifest master(s) 530 need to be determined for an additional file 218. If the control application 317 determines that regional master(s) 510, local master(s) 520, and/or manifest master(s) 530 need to be determined for an additional file 218, then the method 600 returns to step 610. If the control application 317 determines that regional master(s) 510, local master(s) 520, and/or manifest master(s) 530 do not need to be determined for an additional file 218, then the method 600 terminates.

In sum, a control application performs a hashing operation on a plurality of server IDs to generate a hash data structure. The control application then performs a hashing operation on a file ID and compares the hash value to the hash data structure to select one or more regional masters. The hash data structure is then filtered for each local cluster and manifest cluster in order to determine the local master(s) and manifest master(s), respectively, through which the file will be replicated. The control application further assigns a predetermined delay to each local master tier, manifest master tier, and non-master tier in order to control the rate at which the file is replicated through the infrastructure network.

At least one advantage of the disclosed techniques is that each file can be replicated across a network in a predictable, decentralized, and highly fault-tolerant manner via specific tiers of content servers, without requiring an entity to maintain a master index. Additionally, the number of content servers included in each tier through which a file is replicated may be controlled, for example, based on the popularity of and demand for the file, by specifying a replication factor on a per-tier or per-file basis. Further, a predetermined delay may be assigned to each tier in order to prevent lower tiers from flooding content servers included in upper tiers, reducing the severity of server load fluctuations. Moreover, because the content servers included in each tier are determined based on the identifier associated with the file, each file may propagate through the network infrastructure via a different sequence of content servers. As a result, network and processing loads are more evenly distributed among the content servers, increasing the overall quality of service provided to users that are accessing web-based applications via the content servers.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of files, hashing operations, and server tiers, persons skilled in the art will appreciate that the systems and techniques described herein are applicable to other types of data files, algorithms, and tier hierarchies. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for caching file data within a computer network, comprising:
    performing a first hashing operation on a file ID associated with a content file stored at a third-party fill source to generate a first hash value;
    performing a second hashing operation on a plurality of server identifiers (IDs) to generate a plurality of hash values for the server IDs;
    comparing the first hash value to the plurality of hash values for the server IDs to identify a first regional master server included in a regional cluster of servers;
    causing the first regional master server to retrieve the content file from the third-party fill source via a network connection; and
    for a first local cluster of servers included in the regional cluster of servers:
        performing one or more operations to identify a first local master server included in the first local cluster of servers; and
        causing the first local mater server to retrieve the content file from the first regional mater server instead of retrieving the content file from the third-party fill source.

2. The computer-implemented method of claim 1, further comprising, for a first manifest cluster of servers included in the first local cluster of servers:
    performing one or more operations to identify a first manifest master server included in the first manifest cluster of servers; and causing the first manifest master server to retrieve the content file from the first local master server.

3. The computer-implemented method of claim 2, further comprising causing the first local master server to wait a first predetermined period of time before retrieving the content file from the first regional master server, and causing the first manifest master server to wait a second predetermined period of time before retrieving the content file from the first local master server.

4. The computer-implemented method of claim 1, wherein the plurality of server IDs identify different servers include in the regional cluster of servers.

5. The computer-implemented method of claim 1, further comprising performing a filtering operation on a hash data structure based on the first hash value.

6. The computer-implemented method of claim 5, further comprising, for a first manifest cluster of servers included in the first local cluster of servers:
    filtering the hash data structure based on the first hash value to identify a first manifest master server included in the first manifest cluster of servers; and
    causing the first manifest master server to retrieve the content file from the first local master server.

7. The computer-implemented method of claim 5, wherein the hash data structure comprises a hash ring, and the first hashing operation and the second hashing operation comprise consistent hashing operations.

8. The computer-implemented method of claim 5, wherein performing the second hashing operation comprises, for each server ID:
    combining the server ID with a plurality of different values to generate a plurality of different server ID instances;
    hashing each of the plurality of server ID instances to generate the plurality of hash values for the server IDs; and
    storing the plurality of hash values for the server IDs in the hash data structure.

9. The computer-implemented method of claim 1, wherein a number of regional master servers and a number of local master servers are based on at least one replication factor associated with the content file.

10. A computer system, comprising:
    one or more memories storing instructions; and
    one or more processors that are coupled to the one or more memories and, when executing the instructions, perform the steps of:
        performing a first hashing operation on a file ID associated with a content file stored at a third-party fill source to generate a first hash value;
        performing a second hashing operation on a plurality of server identifiers (IDs) to generate a plurality of hash values for the server IDs;
        comparing the first hash value to the plurality of hash values for the server IDs to identify a first regional master server included in a regional cluster of servers;
        causing the first regional master server to retrieve the content file from the third-party fill source via a network connection; and
        for a first local cluster of servers included in the regional cluster of servers:
            performing one or more operations to identify a first local master server included in the first local cluster of servers; and
            causing the first local mater server to retrieve the content file from the first regional mater server instead of retrieving the content file from the third-party fill source.

11. The computer system of claim 10, wherein the one or more processors, for a first manifest cluster of servers included in the first local cluster of servers, further perform the steps of:
    performing one or more operations to identify a first manifest master server included in the first manifest cluster of servers; and
    causing the first manifest master server to retrieve the content file from the first local master server.

12. The computer system of claim 11, wherein the one or more processors further perform the steps of causing the first local master server to wait a first predetermined period of time before retrieving the content file from the first regional master server, and causing the first manifest master server to wait a second predetermined period of time before retrieving the content file from the first local master server.

13. The computer system of claim 11, wherein the plurality of server IDs identify different servers include in the regional cluster of servers.

14. The computer system of claim 10, wherein the one or more processors further perform the step of performing a filtering operation on a hash data structure based on the first hash value.

15. The computer system of claim 14, wherein the one or more processors, for a first manifest cluster of servers included in the first local cluster of servers, further perform the steps of:
    filtering the hash data structure based on the first hash value to identify a first manifest master server included in the first manifest cluster of servers; and
    causing the first manifest master server to retrieve the content file from the first local master server.

16. The computer system of claim 14, wherein the hash data structure comprises a hash ring, and the first hashing operation and the second hashing operation comprise consistent hashing operations.

17. The computer system of claim 14, wherein, when performing the second hashing operation comprises, the one or more processors, for each server ID, further perform the steps of:
    combining the server ID with a plurality of different values to generate a plurality of different server ID instances;
    hashing each of the plurality of server ID instances to generate the plurality of hash values for the server IDs; and
    storing the plurality of hash values for the server IDs in the hash data structure.

18. The computer system of claim 10, wherein a first number of servers included in a first plurality of regional master servers is based on a first replication factor associated with a regional master server tier, and a second number of servers included in a plurality of local master servers is based on a second replication factor associated with a local master server tier.

19. One or more non-transitory computer-readable media including instructions that, when executed by one or more processors, cause the one or more processors to perform the steps of:
    performing a first hashing operation on a file ID associated with a content file stored at a third-party fill source to generate a first hash value;

performing a second hashing operation on a plurality of server identifiers (IDs) to generate a plurality of hash values for the server IDs;

comparing the first hash value to the plurality of hash values for the server IDs to identify a first regional master server included in a regional cluster of servers;

causing the first regional master server to retrieve the content file from the third-party fill source via a network connection; and for a first local cluster of servers included in the regional cluster of servers:

performing one or more operations to identify a first local master server included in the first local cluster of servers; and causing the first local mater server to retrieve the content file from the first regional mater server instead of retrieving the content file from the third-party fill source.

20. The one or more non-transitory computer-readable media of claim 19, further comprising, for a first manifest cluster of servers included in the first local cluster of servers:

performing one or more operations to identify a first manifest master server included in the first manifest cluster of servers; and causing the first manifest master server to retrieve the content file from the first local master server.

21. The one or more non-transitory computer-readable media of claim 20, further comprising causing the first local master server to wait a first predetermined period of time before retrieving the content file from the first regional master server, and causing the first manifest master server to wait a second predetermined period of time before retrieving the content file from the first local master server.

22. The one or more non-transitory computer-readable media of claim 19, wherein the plurality of server IDs identify different servers include in the regional cluster of servers.

23. The one or more non-transitory computer-readable media of claim 19, further comprising performing a filtering operation on a hash data structure based on the first hash value.

24. The one or more non-transitory computer-readable media of claim 23, further comprising, for a first manifest cluster of servers included in the first local cluster of servers:

filtering the hash data structure based on the first hash value to identify a first manifest master server included in the first manifest cluster of servers; and causing the first manifest master server to retrieve the content file from the first local master server.

25. The one or more non-transitory computer-readable media of claim 23, wherein the hash data structure comprises a hash ring, and the first hashing operation and the second hashing operation comprise consistent hashing operations.

26. The one or more non-transitory computer-readable media of claim 23, wherein performing the second hashing operation comprises, for each server ID:

combining the server ID with a plurality of different values to generate a plurality of different server ID instances;

hashing each of the plurality of server ID instances to generate the plurality of hash values for the server IDs; and storing the plurality of hash values for the server IDs in the hash data structure.

27. The one or more non-transitory computer-readable media of claim 19, wherein a number of regional master servers and a number of local master servers are based on at least one replication factor associated with the content file.

* * * * *